(12) United States Patent  (10) Patent No.: US 8,391,853 B2
Kramarz-vonKohout et al.  (45) Date of Patent: Mar. 5, 2013

(54) SPECIAL MOBILE RADIO TELEPHONE SUPPLY WITH INHERENT ACCESS

(75) Inventors: Gerhard Kramarz-vonKohout, Bonn (DE); Matthias Roebke, Cologne (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 13/000,588

(22) PCT Filed: Mar. 23, 2009

(86) PCT No.: PCT/EP2009/002116
§ 371 (c)(1),
(2), (4) Date: Mar. 29, 2011

(87) PCT Pub. No.: WO2009/152886
PCT Pub. Date: Dec. 23, 2009

(65) Prior Publication Data
US 2011/0183646 A1   Jul. 28, 2011

(30) Foreign Application Priority Data

Jun. 19, 2008  (DE) .......................... 10 2008 028 817
Aug. 29, 2008  (DE) .......................... 10 2008 044 929

(51) Int. Cl.
*H04M 3/16*  (2006.01)
(52) U.S. Cl. ......... 455/418; 455/411; 455/410; 713/189
(58) Field of Classification Search .................. 455/418, 455/411, 410; 713/189
See application file for complete search history.

(56) References Cited

U.S. PATENT DOCUMENTS

| | | | |
|---|---|---|---|
| 5,839,067 A * | 11/1998 | Jonsson | ..................... 455/432.3 |
| 6,002,679 A | 12/1999 | Liu et al. | |
| 7,730,175 B1 * | 6/2010 | Roesch et al. | ................. 709/224 |
| 7,792,530 B2 | 9/2010 | Tariq | |
| 2002/0188562 A1 * | 12/2002 | Igarashi et al. | ................. 705/40 |
| 2008/0026726 A1 | 1/2008 | Tariq | |
| 2008/0235520 A1 * | 9/2008 | Becker et al. | ................. 713/189 |
| 2009/0196268 A1 | 8/2009 | Caldwell | |

* cited by examiner

*Primary Examiner* — Danh Le
(74) *Attorney, Agent, or Firm* — Andrew Wilford

(57) ABSTRACT

The invention relates to a cellular mobile radio telephone system and to a method for operating a cellular mobile radio network, in which mobile radio terminals can be checked in order to use the services of the mobile radio network. According to the invention, each mobile radio terminal that is checked into the mobile radio network can be uniquely identified by a subscriber identity, the subscriber identity of a checked-in mobile radio terminal is compared with a list of released subscriber identities and if there is a match, the use of services of the mobile radio network is released. If no match is found for the subscriber identity on the list of released subscriber identities, the use of the services of this mobile radio network is blocked and/or a general block is placed on the use of all mobile radio networks for said mobile radio terminal.

12 Claims, 4 Drawing Sheets

SPECIAL MOBILE RADIO TELEPHONE SUPPLY WITH INHERENT ACCESS

CROSS REFERENCE TO RELATED APPLICATIONS

This application is the US-national stage of PCT application PCT/EP2009/002116, filed 23 Mar. 2009, published 23 Dec. 2009 as WO2009/152886, and claiming the priority of German patent application 102008028817.9 itself filed 19 Jun. 2008 and German patent application 102008044929.6 itself filed 29 Aug. 2008.

FIELD OF THE INVENTION

The invention relates to a method of operating a cellular mobile wireless network onto which mobile wireless terminals may log in order to use the services of the mobile wireless network, where each mobile wireless terminal that is logged onto the mobile wireless network may be uniquely identified by a subscriber identity, and a cellular mobile wireless system, having a mobile wireless network with a plurality of wireless cells onto which the mobile wireless terminals may log in order to use the services of the mobile wireless system.

BACKGROUND OF THE INVENTION

The term "mobile wireless terminal" in the present context also encompasses the subscriber-specific SIM/USIM (chip card or some other design, as well as software approaches such as a virtual SIM/USIM, for example) associated with the mobile wireless terminal that is the carrier of the IMSI subscriber identity.

The invention in particular relates to a system for providing a given area with mobile wireless service, where this area is already provided, in whole or in part, with mobile wireless itself or with compatible network technology (in particular GSM, UMTS, or also technologies of the next mobile wireless generation such as LTE, for example), the access management ensuring that in this area a group of users is not able to use one mobile wireless service or the other for communication, and that another group of users is able to use only the additionally provided mobile wireless service.

In prisons, inmates are generally prohibited from possessing and using mobile wireless terminals. The detection of terminals by body searches or using metal detectors is often difficult. In this regard, jamming transmitters are used in some prisons that interfere with the frequencies of the local mobile wireless transmitters (GSM, UMTS, or also technologies of the next mobile wireless generation such as LTE, for example), so that inmates in possession of a mobile wireless terminal are not able to use it. However, the jamming transmitters interfere not only with this unauthorized mobile wireless communication, but possibly also with authorized mobile wireless communication. The interference from the jamming transmitters may also impair or prevent permissible mobile wireless communication, such as by staff within the prison. Depending on the structural design of the prison and the strength of the jamming transmitter, permissible mobile wireless communication by third parties outside the prison area may also be impaired or prevented.

The use of so-called IMSI catchers, as proposed in EP 10151053 B1, is also conceivable. Such an IMSI catcher represents a virtual wireless cell for a mobile wireless network, the virtual wireless cell taking over parameters of an actual wireless cell of the mobile wireless network from the immediate vicinity. This wireless cell is "virtual" in that it is not integrated into the mobile wireless network, so that, for example, calls cannot be relayed to this cell from the mobile wireless network. By use of the IMSI catcher, the mobile wireless terminals for which this virtual wireless cell is the most attractive cell from a mobile wireless standpoint may be "captured." The IMSI and IMEI of the SIM/USIM, i.e. the user's terminal, may thus be evaluated. The terminal cannot be called while it is captured. Depending on the configuration of the IMSI catcher, an outgoing communication connection could be established via an SIM/USIM that is part of the IMSI catcher and logged onto a mobile wireless network that is permitted for the SIM/USIM. Outgoing calls would then be routed to the mobile wireless network and also billed via this SIM/USIM. In one special aspect it is also known for the IMSI catcher to be able to block calls. In addition, a present IMSI catcher is able to hold the "captured" terminals for any given length of time, so that during this period a captured mobile wireless terminal can neither make nor receive calls. Holding of the terminals in the virtual "IMSI catcher cell" does not end until the IMSI catcher is deactivated or the mobile wireless terminal logs back on outside the virtual cell in a regular mobile wireless network.

The virtual cell of the IMSI catcher, as described, concerns a single mobile wireless network. Mobile wireless terminals having cards for other national mobile wireless networks are generally not captured, since the SIM/USIM usually contains an appropriate entry in the "forbidden PLMN" list.

If an IMSI catcher were used inside a prison, the IMSI catcher could prevent communication by the inmates within the operational area of the prison's virtual cell and for the mobile wireless network for which it is designed. It would be necessary to install additional corresponding IMSI catchers, each with an appropriate SIM/USIM, in order to block further mobile wireless networks. Another disadvantage in this case is that staff or unaffiliated third parties outside the prison might be affected within the operational area of the virtual cell of the IMSI catcher, so that they might be unable to make or receive calls even though they were permitted to do so. This could have very serious consequences if, for example, due to the use of an IMSI catcher an emergency call could not be placed because the caller was located in the operational area of the IMSI catcher.

OBJECT OF THE INVENTION

The object of the invention is to overcome the above-given disadvantages, and in particular to allow a certain specified area (such as the area of a prison or the like) to be covered by the operational area of the system, so that at that location only authorized persons are permitted to use the mobile communication, and that outside the specified area the system basically has no interfering effects.

SUMMARY OF THE INVENTION

In the method according to the invention of operating a cellular mobile wireless network, and in the cellular mobile wireless system that is suited and set up in particular for carrying out and using the method according to the invention and having a mobile wireless network with a plurality of wireless cells onto which mobile wireless terminals may log in order to use the services of the mobile wireless system, it is particularly advantageous that the subscriber identity of each logged-on mobile wireless terminal is compared to a list of enabled subscriber identities, and, if there is a match, use of the services of the mobile wireless network in the wireless cell is enabled for the associated mobile wireless terminal, and, if the subscriber identity does not match the list of enabled subscriber identities, is use of the services of the mobile wireless network according to the invention is blocked, and/or a general block is placed on the use of all mobile wireless networks for the associated mobile wireless terminal and/or for the subscriber identity. In addition, information concerning active subscriber identities of mobile wireless terminals logged onto other mobile wireless networks may be evaluated. This information, which may include identifiers and location information, for example, is provided by detection devices, for example.

The mobile wireless network is particularly preferably composed of small-scale, closely meshed wireless cells whose signal power locally exceeds the signal power of other receivable mobile wireless networks. A mobile wireless network applied in this manner allows a given area to be provided with a further mobile wireless network with sufficient accuracy for operation, so that within the given area this mobile wireless network is the mobile wireless network having the strongest local signal power in each case, but outside the given area this mobile wireless network has weaker signal power than the mobile wireless networks already present at that location. As a result of the weaker signal power of the mobile wireless network applied inside, the outside mobile wireless networks, outside the mobile wireless network applied inside, are not disturbed. The lower the power of the individual wireless stations of the mobile wireless network, the higher the accuracy of the demarcation with respect to the outside that can be achieved.

It is possible to uniquely identify the subscriber identity in particular by querying and checking the International Mobile Subscriber Identity (IMSI) used in a mobile wireless network for the unique identification of network subscribers (internal subscriber recognition). By comparing to an approval list ("whitelist") that stores all subscribers in the local area and/or mobile wireless network that are authorized to use the services of the network, together with the associated International Mobile Subscriber Identity (IMSI), reliable checking of authorized use is ensured, and unauthorized use of the services of the mobile wireless network is prevented.

As an alternative or in addition to a comparison to a list of approved network subscribers, such as the whitelist described above, authorized persons receive mobile wireless cards having an access class in accordance with 3GPP 22.011 that is unequal to 0-9. Because typical mobile wireless cards (i.e. in principle also the mobile wireless cards of inmates in a prison, for example) have an access class equal to 0-9, this results in blocking of these access classes 0-9 in the upper-level central system for blocking the abilities of unauthorized subscribers, in particular the inmates, to communicate, since the user of a mobile wireless card is not able to change the access class of his card. Thus, maintaining a special whitelist may be dispensed with. However, it is important to note that the possibility cannot be ruled out that an inmate may gain access to a mobile wireless card having a special access class equal to something other than 0-9, since the origin of his mobile wireless card is not known.

In the system according to the invention it is is particularly advantageous that the specified area is or may be covered using small cells, that the demarcation with respect to the outside, as discussed above, is sufficiently distinct so that inside, incoming and outgoing communications are possible only for persons who are explicitly assigned this capability via access management, and incoming and outgoing communications are not possible for all other persons, and that outside the specified area the mobile wireless service present at that location is not adversely affected. The system may thus be designed in such a way that persons receiving the right via the access management to conduct incoming or outgoing communications may utilize this right using the mobile wireless card of any given network provider.

Thus, in a prison, for example, it is possible to permanently prevent mobile wireless communication by the inmates, while explicitly authorized persons within the prison are able to communicate, and the mobile wireless communication of third parties outside the prison is not impaired.

However, the system may also be used in other environments in which communication is generally not allowed, but certain individuals may be authorized to communicate. Thus, there are operators of hospitals as well as movie theaters or other cultural venues who basically intend to prevent mobile communication by the visitors, but not by the attendants. A short-term measure is also conceivable, by means of which at an event in a sports stadium, for example, the mobile wireless communication of the spectators, but not of the security staff, is to be prevented for a period of time.

Each wireless cell is preferably identified with respect to a mobile wireless terminal via Cell Global Identification (CGI) that in particular contains a network identifier (Mobile Network Code (MNC)), and a roaming network configuration is set up with other mobile wireless networks in such a way that in principle, mobile wireless terminals associated with other mobile wireless networks may log onto the mobile wireless network.

The Cell Global Identification (CGI) may be composed at least of a country identifier (Mobile Country Code (MCC)), a network identifier (Mobile Network Code (MNC)), a location identifier (Location Area Code (LAC)), and a wireless cell identifier (Cell ID (CI)) (see 3GPP TS 23.003).

Depending on the MNC, the mobile wireless terminal determines, on the basis of a list of MNCs contained on the SIM/USIM card that the mobile wireless terminal is prevented from logging onto, whether the cell is selected, and therefore logon occurs.

According to the invention, each wireless cell in the area to be provided with service receives a Mobile Network Code (MNC) not present in mobile wireless networks heretofore. In Germany, for example, there are four active mobile wireless network providers, each having its own MCC-MNC combination (262 xy, xy=01 v 02 v 03 v 07). Other MNCs (xy=13, for example) are issued to other companies, although many MNCs still remain unused. Therefore, the system could use wireless cells for which, for example, MCC-MNC=262 77.

Changing a mobile wireless terminal having a nonenabled subscriber identity to a different receivable mobile wireless network is preferably not allowed. Thus, unauthorized use of services of a mobile wireless network is also reliably prevented in the case that the signal strength of another mobile wireless network that also provides coverage at the local position is stronger, and normally a change of networks (roaming) would be carried out.

Another aspect of the invention provides that terminals that are detected as described and whose associated IMSIs are not contained on the whitelist are blocked in their mobile wireless network by use of a dedicated "blocking command" that is sent from the system to the central control system of the network provider associated with the IMSI. The SIM/USIM having this IMSI is thus blocked, and such a card may not be used to communicate, either in the IMSI's own mobile wireless network or in outside mobile wireless networks. Unblocking is then possible only upon request to the associated network provider.

It is also possible for information (identifiers, location information, for example) concerning subscriber identities that are active in other networks, for example, to be received and evaluated in the central control system.

On the one hand, a check may be made as to whether one of these subscriber identities is present on the list of approved subscriber identities. If this is the case, this subscriber identity may be deleted from the list, so that it can no longer be used in the mobile wireless network according to the invention. On the other hand, the SIM/USIM having this subscriber identity may be blocked for network services in its home network, in which a blocking command is sent to the home network for the subscriber identity.

In this manner, subscriber identities may also be taken into account without the need for a logon attempt to the mobile wireless network by the subscriber identity that is blocked or is to be blocked. Thus, such blocking may be performed in particular via a central entity that communicates with one or more mobile wireless networks.

The current network identifier entered in the home register is particularly preferably checked when an attempt is made to change a logged-on mobile wireless terminal to a different mobile wireless network.

For a mobile wireless terminal having an enabled subscriber identity, a special network identifier is preferably stored in the home register, wherein a change of the mobile wireless terminal to a different mobile wireless network is permitted after the network identifier is checked, based on the special network identifier that indicates that use is permitted; for a mobile wireless terminal having a nonenabled subscriber identity, a change to a different mobile wireless network is prevented after the network identifier is checked.

All logged-on mobile wireless terminals in a wireless cell are preferably initially captured so that a change to a different network is not possible, at least until a comparison is made with the list of enabled subscriber identities.

Since IMSIs of any given mobile wireless networks may be present on the whitelist, femtocells must also at the same time be connected to all mobile wireless networks of the country that is easily achieved via the internet/IP. The IMSI is present as plaintext. Since it is known that the associated mobile wireless network is based on IMSI, it is thus possible to route to a suitable mobile wireless network. If the whitelist also contains international IMSIs, the particular national mobile wireless network that has a roaming relationship with the corresponding international network provider must also be determined in the system. The routing itself is performed on the basis of a table that assigns an IP address to each mobile wireless network. This IP address represents a gateway that for UMTS technology, for example, has functionality with respect to the mobile wireless network via Radio Network Controller (RNC).

Accordingly, the mobile wireless network is preferably linked to further available mobile wireless networks, in particular via the internet/IP; i.e. a linkage occurs with the mobile wireless networks that are available, and/or with further mobile wireless networks. The further mobile wireless networks may be domestic as well as foreign networks, as explained above.

In particular, roaming relationships may exist with further mobile wireless networks, and the list of enabled subscriber identities may also contain such subscriber identities from international and/or foreign mobile wireless networks.

In the event that a mobile wireless terminal is not logged onto the mobile wireless network, for the subscriber identity of a mobile wireless terminal that is not logged onto this mobile wireless network use of the services of this mobile wireless network may be blocked by deletion from a list of enabled subscriber identities, and/or use of the services of the home network may be blocked via a blocking command to the home network.

In this manner, a subscriber, i.e. a mobile wireless terminal, may also be blocked when the terminal is not logged onto the mobile wireless network, for example due to a different technical platform, when a UMTS network is involved but the terminal is a GSM terminal. The subscriber identity is not bound to the technology (for example, a terminal that supports both GSM and UMTS may be used with a single SIM/USIM having a single subscriber identity). Using a GSM terminal, the newly provided UMTS network cannot be logged onto due to technical incompatibility. Conversely, this means that, for example, an inmate having a strictly GSM terminal would not be affected by the newly provided mobile wireless service, and therefore could make telephone calls without hindrance. This risk may be effectively eliminated using the method according to the invention.

It is preferably possible for information concerning a subscriber identity of a mobile wireless terminal that is not logged onto this mobile wireless network to be received and evaluated online and/or offline, in particular by detection devices, and/or by other mobile wireless networks and/or public authorities and the like. Thus, for example, public authorities such as police and the like may easily block a subscriber. Such blocking may accordingly be performed in particular via a central entity that communicates with one or more mobile wireless networks.

The method and the system may be implemented as follows, for example: Each wireless cell is identified with respect to the mobile wireless terminal, using Cell Global Identification (CGI). In accordance with 3GPP TS 23.003, CGI comprises the following:

Mobile Country Code (MCC)+Mobile Network Code (MNC)+Location Area Code (LAC)+Cell ID (CI).

Depending on the MNC, the mobile wireless terminal determines, on the basis of a list of MNCs contained on the SIM/USIM card that the mobile wireless terminal is prevented from logging onto, whether the cell is selected, and therefore logon occurs.

According to the invention, each wireless cell in the area to be provided with service receives a Mobile Network Code (MNC) not present in mobile wireless networks heretofore. In Germany, for example, there are four active mobile wireless network providers, each having its own MCC-MNC combination (262 xy, xy=01 v 02 v 03 v 07). Other MNCs (xy=13, for example) are issued to other companies, although many MNCs still remain unused. Therefore, the system could use wireless cells for which, for example, MCC-MNC=262 77.

With an appropriate roaming configuration, in principle any SIM/USIM, also an SIM/USIM of the national mobile wireless networks for which MCC-MNC=262 xy, may thus use the new mobile wireless network, since the described MCC-MNC combination is not contained in the list of mobile wireless networks not to be used. When individual users receive a special mobile wireless card from their network provider that is designed in particular for this MCC-MNC combination (in the example: 262 77) and that contains additional information concerning this MCC-MNC combination, these users may also receive a special display that may possibly be adapted to the operational area ("JVA Bonn," for example). The particular display that users receive with the regular mobile wireless card, and whether the users also receive information concerning the new network, depends on the SIM/USIM, and optionally the mobile wireless terminal, used.

The system for controlling the wireless cells using its own MCC-MNC should be designed in such a way that all mobile wireless terminals are captured and their IMSIs are compared to a list (whitelist). Mobile wireless terminals having a mobile wireless card whose IMSI is present on the list may conduct incoming and outgoing communications. All other mobile wireless terminals having a mobile wireless card whose IMSI is not present on the list are permanently held, and are not able to conduct incoming or outgoing communication. In one particular aspect, however, emergency calls could be allowed even if the IMSI is not present on the whitelist.

This ensures that the mobile wireless terminals of all inmates, regardless of which national or international network provider their Subscriber Identity Module (SIM/USIM) belongs to, are captured and held and thus are not able to communicate. Communication would be possible for the inmate only if his IMSI was contained in the referenced whitelist.

The holding of a terminal in the cells using its own MCC-MNC code would not end until the mobile wireless terminal is logged onto a different mobile wireless network.

To prevent this, i.e. to prohibit the mobile wireless terminal from communicating in this different mobile wireless network, the following method is proposed:

When a mobile wireless terminal is logged onto the mobile wireless network using an independent MCC-MNC code (in the example: 262 77), the current network, in the present case 262 77, is entered into the HLR/HSS register of the home network, as is customary. A function is to be implemented in this home network that evaluates the current network and prevents the card from being relogged onto the home network from 262 77, optionally with additional evaluation of the cell ID (CI), so that relogging is prevented only when the mobile wireless terminal is in the vicinity of the prison area, for example. This blocking would affect not only the inmates, but possibly also the authorized users. To protect the authorized users, whose IMSIs are determined to be on the whitelist, from this described blocking by the home network, according to the invention a second MCC-MNC code, for example 262 78, is used solely for this purpose. The code 262 78, not 262 77, is transmitted as the current network to the HLR/HSS home register of the home network for the authorized users, i.e. for the IMSIs that are determined to be on the whitelist. Authorized users would thus be able to log onto their home network at any time. The authorized users are also able to log onto a different network that is present, when this is basically permitted for the particular IMSI on the basis of existing, possibly national, roaming relationships.

The wireless cells are basically to be designed as low-power wireless cells (for example, femtocells connected via the internet to the associated mobile wireless network). For the dimensioning, on the one hand it must be ensured that the newly installed wireless cells provide a wireless service in the desired area (for example, for a specified prison area) that exceeds the wireless service provided by other wireless networks present at that location, for example by using customary macrocells. On the other hand, it must be ensured in the dimensioning that the wireless cells have the lowest power possible, so that the provision of service to areas outside the desired area is ensured by the wireless service provided by other mobile wireless networks present at that location, and is not exceeded by the newly installed wireless cells. In principle, the greater the number of wireless cells that are newly installed, the lower the power that the individual wireless cell may have. In this regard, both requirements may be easily met.

It is thus possible to optimally provide service to the desired area without providing service to areas beyond the desired area. In particular when the femtocells are installed only inside a building, the provision of service outside the building, also in the immediate vicinity, is only marginal, so that it may be stated that the provision of service by the femtocells does not interfere with the provision of service that is present outside.

As described, the system for central control of the wireless cells using an independent MCC-MNC is to be designed in such a way that all mobile wireless terminals are captured, and their IMSIs are compared to a list (whitelist). Femtocells are basically connected to the associated mobile wireless network via the internet. Since IMSIs of any given mobile wireless networks may be present on the whitelist, the femtocells must also at the same time be connected to all mobile wireless networks of the country that is easily achieved via the internet/IP. The IMSI is present as plaintext. Since it is known that the associated mobile wireless network is based on IMSI, it is thus possible to route to a suitable mobile wireless network. If the whitelist also contains international IMSIs, the particular national mobile wireless network that has a roaming relationship with the corresponding international network provider must also be determined in the system. The routing itself is performed on the basis of a table that assigns an IP address to each mobile wireless network. This IP address represents a gateway that for UMTS technology, for example, has functionality with respect to the mobile wireless network via Radio Network Controller (RNC).

The central control system also has the customary mobile wireless network functionalities (with regard to GSM, UMTS, LTE, or others) in order to allow incoming and outgoing communication.

Another aspect of the invention provides that terminals that are detected as described and whose associated IMSIs are not contained on the whitelist are blocked in their mobile wireless network by use of a dedicated "blocking command" that is sent from the system to the central control system of the network provider associated with the IMSI. The SIM/USIM having this IMSI is thus blocked, and such a card may not be used to communicate, either in the IMSI's own mobile wireless network or in outside mobile wireless networks. Unblocking is then possible only upon request to the associated network provider.

Depending on the particular local circumstances, for the specified area mobile wireless service may be provided in parallel, using different technologies (for example, parallel GSM and UMTS). Various aspects of the invention are possible in such a situation:

Wireless cells for these various technologies are connected to the central control system in the described manner.

Alternatively, for each of the different technologies a system for central control is implemented, to which wireless cells for the particular technology are connected in the described manner. Another aspect of this situation is described below.

Detection devices are known that are able to detect the locally active IMSIs. Reference is made, for example, to the previously described IMSI catchers. The referenced IMSI catchers detect the locally active IMSIs, but do not forward this information.

For the use according to the invention, the detection device must then be provided with a transmitter. The detection device and the central control system are to be connected to one another (via the internet or the local network, for example) in such a way that the detection device is able to transmit information to the central control system.

Thus, in another alternative aspect the central control system is able to not only send blocking commands, but also to receive and evaluate additional information concerning active IMSIs such as identifiers or location information, for example. This information may be provided in particular by detection devices that are able to detect the locally active IMSIs, or by other systems, for example online, or by network management systems of other mobile wireless networks or by third parties (police, for example), for example offline.

For IMSIs received in this manner, the central control system may send blocking commands as necessary to the network provider associated with the particular IMSI. Thus, subscriber identities that are not present on the whitelist, and that for technical reasons or due to incompatibility are not provided by the mobile wireless network according to the invention for the special mobile wireless service of the specified area, may still be blocked. If an IMSI received in this manner is on the whitelist, this IMSI may then be deleted from the whitelist.

If, for example, the mobile wireless network according to the invention is composed solely of UMTS femtocells, due to technical incompatibility a GSM terminal is not able to log onto the mobile wireless network. However, the GSM terminal could use a GSM network possibly already present in the specified area. This terminal may be detected by using a GSM detection device, and after transmitting the associated IMSI to the central control system may be blocked by sending a corresponding blocking command to the network provider associated with the IMSI.

It should be noted that detection devices should only be used that detect with the greatest possible accuracy only the IMSIs of terminals that are present in the specified area, so that IMSIs of terminals that are located outside the specified area and whose users have the right to unhampered communication are not blocked.

Thus, for the above-described scenario, namely, when for the specified area the mobile wireless service is already provided in parallel by various technologies (parallel GSM and UMTS, for example), this results in another aspect of the invention:

As described above, a portion of the technologies present in the specified area are detected using one or more "central control systems" and associated wireless cells. For the remaining technologies present in the specified area, detection devices are implemented that provide their information via active IMSIs for at least one of the central control systems that are present.

If, for example, the mobile wireless network according to the invention, having one or two central control systems, were to have parallel GSM and UMTS functionalities, detection devices would not be necessary unless LTE wireless service was also provided in the specified area. At that time, the function of the detection devices would be to detect the LTE terminals at that location and to provide the associated IMSIs to the central control system.

In another alternative aspect, the authorized users receive mobile wireless cards having an access class in accordance with 3GPP 22.011 that is unequal to 0-9. Because typical mobile wireless cards (i.e. in principle also the mobile wireless cards of the inmates) have an access class equal to 0-9, this results in blocking of these access classes 0-9 in the upper-level central system for blocking the abilities of the inmates to communicate, since the user of a mobile wireless card is not able to change the access class of his card. Thus, maintaining a special whitelist may be dispensed with. However, it is important to note that the possibility cannot be ruled out that an inmate may gain access to a mobile wireless card having a special access class unequal to 0-9, since the origin of his mobile wireless card is not known.

BRIEF DESCRIPTION OF THE DRAWING

A schematic illustration of one illustrated embodiment is provided in the figures that show the following.

DETAILED DESCRIPTION

Figure 1:
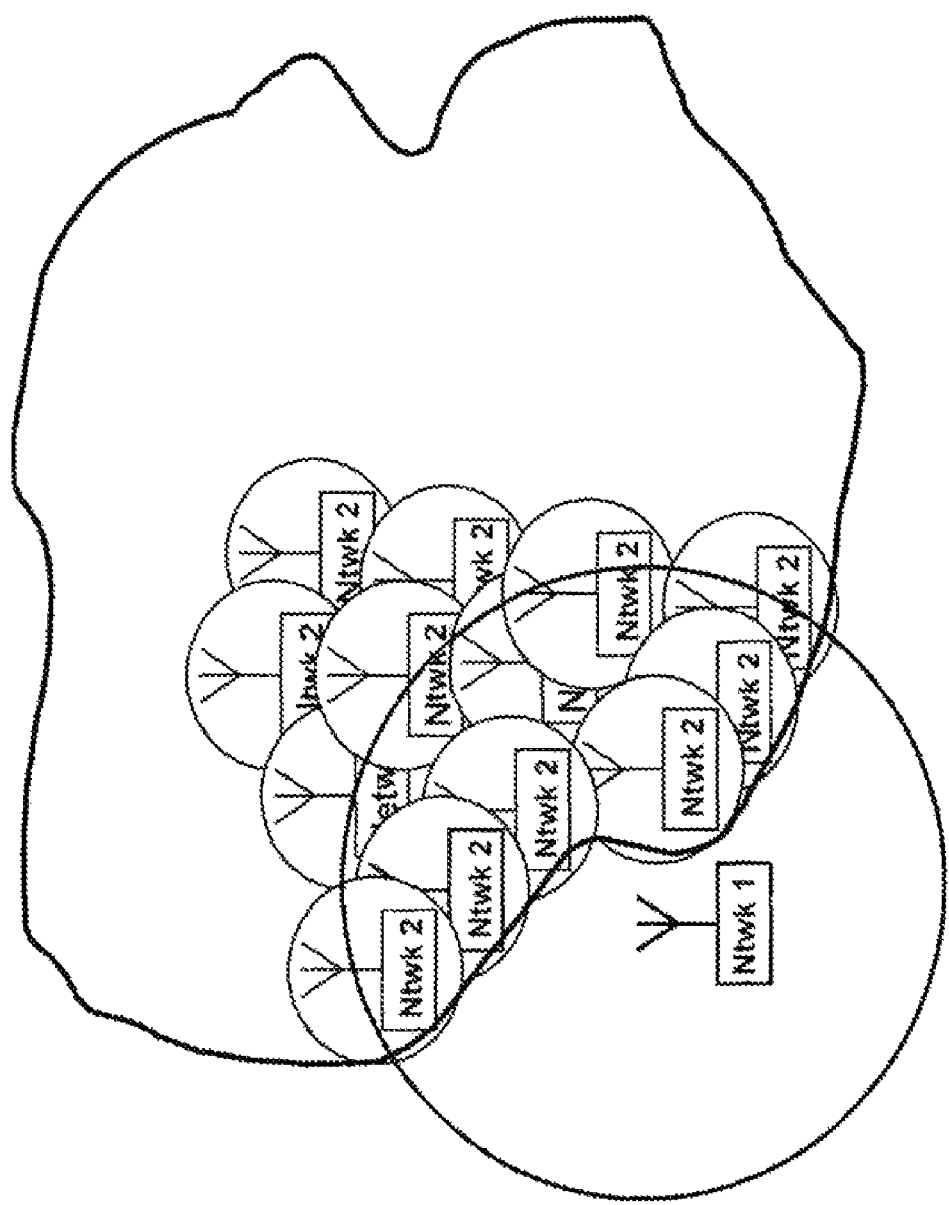
FIG. 1 shows the overlap of an existing mobile wireless service in a narrowly defined area with a closely meshed mobile is wireless network operated according to the invention.

According to FIG. 1, a network 1 represents the existing mobile wireless service of part of an area. The network 2 represents the special mobile wireless service that overlaps with the existing mobile wireless service via the network 1, the boundaries of the area being respected for the most part.

The network 2 is a closely meshed network, i.e. an existing cellular mobile wireless network composed of small, sharply demarcated cells whose local signal strength, however, exceeds the signal strength of the likewise receivable network 1.

Figure 2:
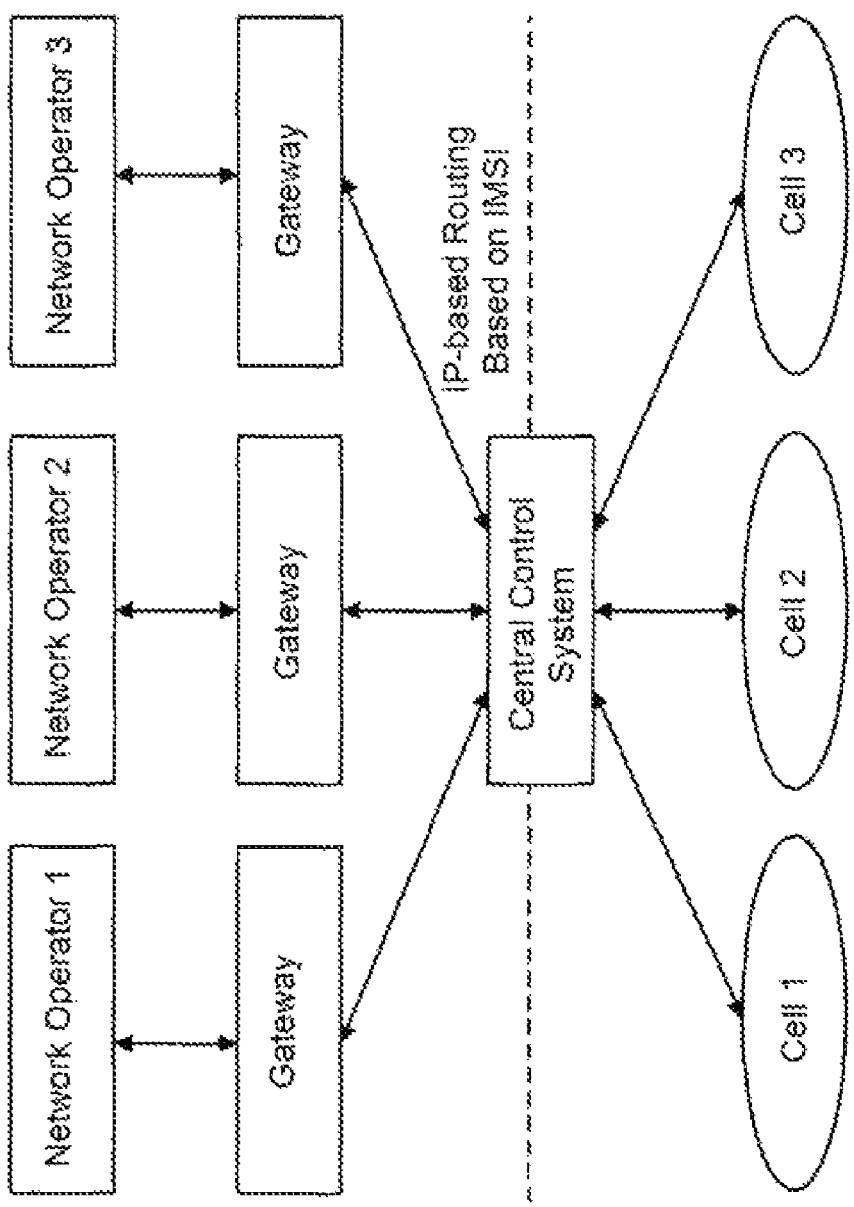
FIG. 2 shows the schematic linkage of multiple present mobile wireless networks, using a procedure according to the invention for operating the network.

The roaming configuration between the network 1 and the network 2 is designed in such a way that the mobile wireless terminals, i.e. the subscribers in the network 1, associated with the network 1 are automatically logged onto the network 2 when the latter provides the best signal. Thus, in the area illustrated in FIG. 1 that is sharply demarcated and covered by the network 2 and that overlaps with the network 1, the mobile wireless terminals log onto the network 2, wherein use of the services of mobile wireless the network 2 is not permitted until the authorization is checked according to the above-described method, i.e. unless there is a positive match of the International Mobil Subscriber Identity (IMSI) subscriber identity with a stored whitelist, i.e. a directory of authorized subscribers. Otherwise, the subscriber, i.e. the mobile wireless terminal, is blocked due to the unapproved IMSI subscriber identity. Due to the blocking, even after leaving the area of the network 2 it is no longer possible to log onto the network 1 until the blocking of the IMSI subscriber identity is lifted by the network provider. Blocking is performed by sending a blocking command to the home network 1 of a mobile wireless terminal having a subscriber identity that is not enabled, and at that location blocking the subscriber identity for communication in this and other mobile wireless networks. The cells of the special network are connected via a "central control system" to the gateway of the corresponding network provider, as illustrated in FIG. 2.

Figure 3:
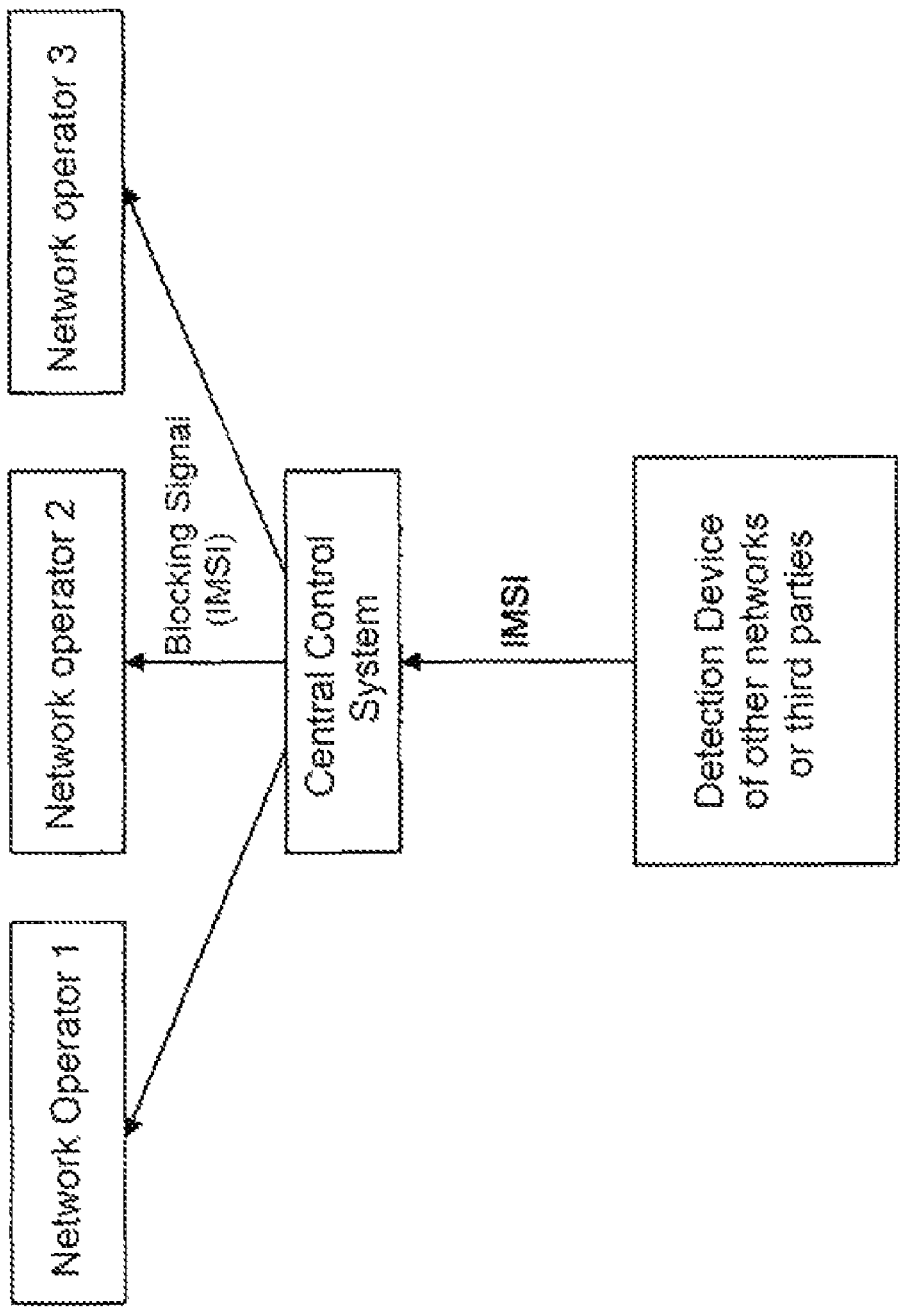
FIG. 3 shows the schematic illustration of the blocking of an IMSI by control of the mobile wireless network according to the invention, on the basis of information already provided.
Figure 4:
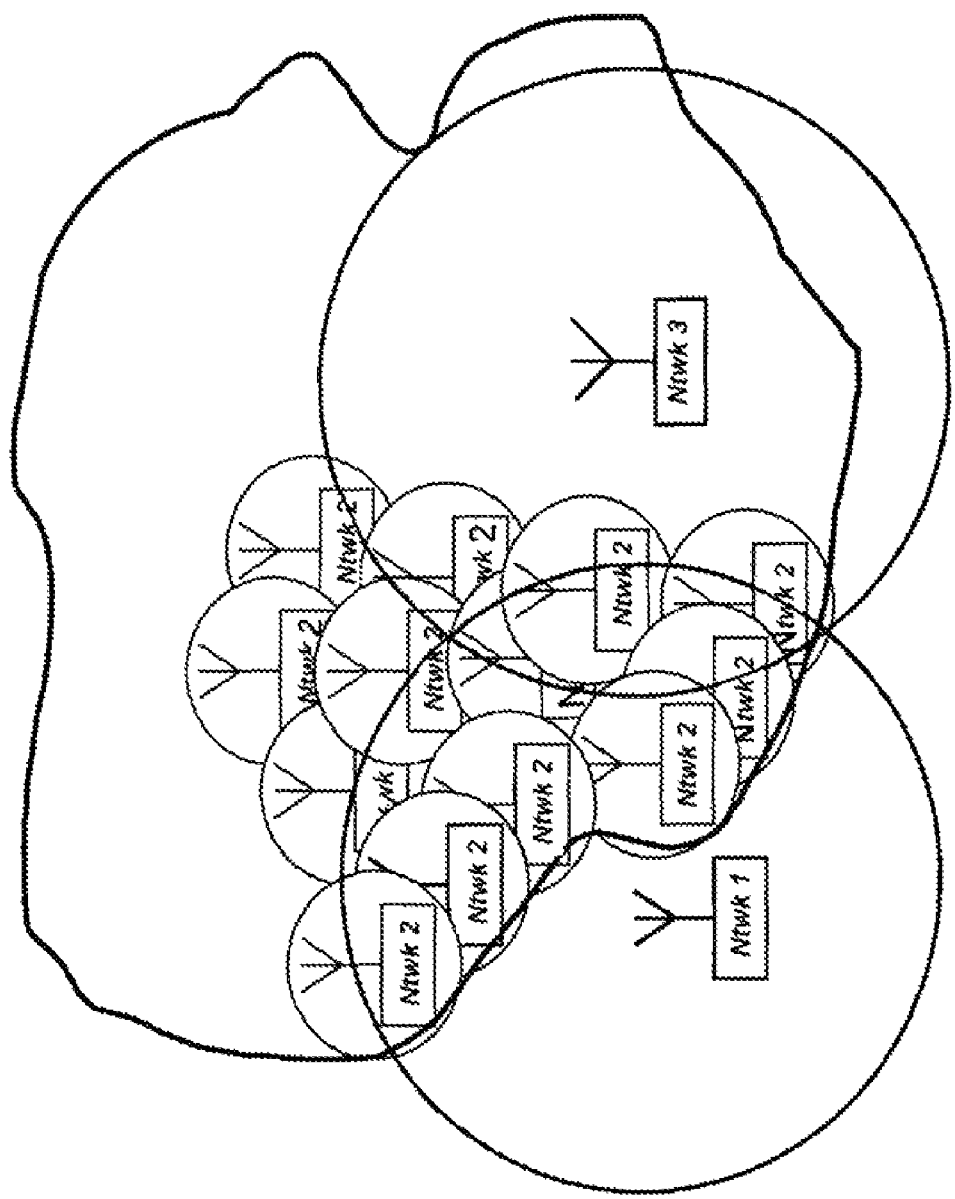
FIG. 4 shows the overlap of an existing mobile wireless service in a narrowly defined area with a closely meshed mobile wireless network operated according to the invention, [on the one hand] using the same wireless technology, and on the other hand by means of a wireless cell using a different wireless technology.

FIG. 4 shows that a portion of the specified area is provided with service by mutually incompatible networks 1 and 3. A terminal that uses a network 3 in the specified area may be detected by using a detection device. As shown in FIG. 3, the detection device provides the IMSI to the network 2. The network 2 then sends a blocking command to the network provider associated with the IMSI.

The invention claimed is:

1. A method of operating a cellular mobile wireless network onto which mobile wireless terminals may log in order to use the services of the mobile wireless network, each mobile wireless terminal logged onto the mobile wireless network being uniquely identified by a subscriber identity, the method comprising the steps of:
    comparing the subscriber identity of a logged-on mobile wireless terminal to a list of enabled subscriber identities,
    if there is a match, enabling use of the services of the mobile wireless network for the mobile wireless terminal,
    if the subscriber identity does not match the list of enabled subscriber identities, blocking use of the services of the mobile wireless network for this subscriber identity or for this mobile wireless terminal,
    identifying each wireless cell with respect to each mobile wireless terminal that is logged onto the cell via a cell global identification that contains a network identifier that is not used by other mobile wireless terminals, and
    setting up a roaming network configuration with other mobile wireless networks in such a way that mobile wireless terminals associated with other mobile wireless networks may log onto the mobile wireless network.

2. The method according to claim 1, wherein the cell global identification is composed at least of a country identifier, a network identifier, a location identifier, and a wireless cell identifier.

3. The method according to claim 1, wherein a mobile wireless terminal having a nonenabled subscriber identity is prevented from logging onto a different receivable mobile wireless network.

4. The method according to claim 1, wherein the current network identifier entered in the home register is checked, using the subscriber identity on the associated SIM/USIM when an attempt is made to change a logged-on mobile wireless terminal to a different mobile wireless network.

5. A method of operating a cellular mobile wireless network onto which mobile wireless terminals may log in order to use the services of the mobile wireless network, each mobile wireless terminal logged onto the mobile wireless network being uniquely identified by a subscriber identity, the method comprising the steps of:
    comparing the subscriber identity of a logged-on mobile wireless terminal to a list of enabled subscriber identities,
    if there is a match, enabling use of the services of the mobile wireless network for the mobile wireless terminal,
    if the subscriber identity does not match the list of enabled subscriber identities, blocking use of the services of the mobile wireless network for this subscriber identity or for this mobile wireless terminal,
    storing for a mobile wireless terminal having an enabled subscriber identity a special network identifier in a home register,
    allowing a change of the mobile wireless terminal to a different mobile wireless network after the network identifier is checked,
    storing for a mobile wireless terminal having a nonenabled subscriber identity a different special network identifier in the home register, and
    preventing a change of the mobile wireless terminal to a different mobile wireless network after the network identifier is checked.

6. The method according to claim 1, wherein a blocking command is sent to the home network of a mobile wireless terminal having a nonenabled subscriber identity, and this subscriber identity is blocked at that location for communication in this and other mobile wireless networks.

7. The method according to claim 1, wherein the user authorization is checked on the basis of the access class of the mobile wireless terminal.

8. The method according to claim 1, wherein the mobile wireless network is linked to further available mobile wireless networks via the internet.

9. The method according to claim 1, wherein roaming relationships exist with further mobile wireless networks, and the list of enabled subscriber identities also includes such subscriber identities from international or foreign mobile wireless networks.

10. The method according to claim 1, wherein all logged-on mobile wireless terminals are initially captured, using the subscriber identity on the associated SIM/USIM, so that a change to a different network is not possible, at least until a comparison is made with the list of enabled subscriber identities.

11. A method of operating a cellular mobile wireless network onto which mobile wireless terminals may log in order to use the services of the mobile wireless network, each mobile wireless terminal logged onto the mobile wireless network being uniquely identified by a subscriber identity, the method comprising the steps of:
    comparing the subscriber identity of a logged-on mobile wireless terminal to a list of enabled subscriber identities,
    if there is a match, enabling use of the services of the mobile wireless network for the mobile wireless terminal,
    if the subscriber identity does not match the list of enabled subscriber identities, blocking use of the services of the mobile wireless network for this subscriber identity or for this mobile wireless terminal, and
    blocking for the subscriber identity of a mobile wireless terminal that is not logged onto this mobile wireless network use of the services of this mobile wireless network by deletion from a list of enabled subscriber identities, or
    blocking use of the services of the home network via a blocking command to the home network.

12. The method according to claim 11, wherein information concerning a subscriber identity of a mobile wireless terminal that is not logged onto this mobile wireless network is received and evaluated online or offline by detection devices or by other mobile wireless networks or public authorities.

* * * * *